(12) United States Patent
Dudar (10) Patent No.: US 12,305,776 B2
(45) Date of Patent: May 20, 2025

(54) SYSTEMS AND METHODS FOR A FUEL REFILL PRESSURE RELIEF VALVE

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 54 days.

(21) Appl. No.: 18/330,924

(22) Filed: Jun. 7, 2023

(65) Prior Publication Data

US 2024/0410494 A1 Dec. 12, 2024

(51) Int. Cl.
*F16K 37/00* (2006.01)
*F02D 13/02* (2006.01)
*F02M 25/08* (2006.01)

(52) U.S. Cl.
CPC ...... *F16K 37/0091* (2013.01); *F02D 13/0242* (2013.01); *F02M 25/0809* (2013.01); *F02M 25/0836* (2013.01)

(58) Field of Classification Search
CPC ............ F16K 37/0091; F02D 13/0242; F02M 25/0809; F02M 25/0836
USPC ...................................................... 73/114.42
See application file for complete search history.

(56) References Cited

U.S. PATENT DOCUMENTS

| | | | | |
|---|---|---|---|---|
| 4,541,367 A * | 9/1985 | Lindberg | ................ | F02B 43/10 123/568.15 |
| 5,207,734 A * | 5/1993 | Day | ...................... | F01N 3/0878 96/135 |
| 5,272,873 A * | 12/1993 | Hamazaki | ........... | F02D 41/0032 60/290 |
| 5,273,020 A * | 12/1993 | Hayami | ................ | F02D 41/004 123/520 |
| 5,780,728 A * | 7/1998 | Takamori | ........... | F02M 25/0809 73/114.39 |
| 5,806,304 A * | 9/1998 | Price | ..................... | F01N 3/2033 123/518 |
| 5,881,700 A * | 3/1999 | Gras | .................... | F02M 25/089 123/520 |
| 5,946,906 A * | 9/1999 | Akazaki | ................ | F02D 9/1055 60/284 |
| 6,122,908 A * | 9/2000 | Wirmark | ............... | F01N 3/0807 60/281 |
| 6,422,214 B1 * | 7/2002 | Sealy | ..................... | F02M 25/08 123/674 |
| 6,550,315 B2 * | 4/2003 | Streib | ................ | F02M 25/0818 73/49.7 |

(Continued)

OTHER PUBLICATIONS

Geldhäuser, S., "Vitesco Technologies Wins Major Order From European Vehicle Manufacturer," Vitesco Website, Available Online at https://www.vitesco-technologies.com/en-us/press-events/press/ 20-03-12, Available as Early as Sep. 25, 2022, 6 pages.

*Primary Examiner* — Kurt Philip Liethen
*Assistant Examiner* — John D Bailey
(74) *Attorney, Agent, or Firm* — Vincent Mastrogiacomo; McCoy Russell LLP (57) ABSTRACT

Methods and systems are provided for diagnosing a fuel refill pressure relief valve that is located along a passage that extends from an exhaust system to a fuel tank. The method may include commanding the fuel refill pressure relief valve open while monitoring flow through particulate filter via a differential pressure sensor.

13 Claims, 5 Drawing Sheets

(56) References Cited

U.S. PATENT DOCUMENTS

| | | | | |
|---|---|---|---|---|
| 6,971,375 B2* | 12/2005 | Amano | ................ | F02M 25/089 |
| | | | | 73/114.38 |
| 7,331,334 B2* | 2/2008 | Leone | .................... | F02M 25/08 |
| | | | | 60/274 |
| 8,112,985 B2* | 2/2012 | Uhrich | ................ | F02M 25/089 |
| | | | | 60/284 |
| 8,333,063 B2* | 12/2012 | Elwart | ..................... | F01N 5/02 |
| | | | | 60/287 |
| 8,413,433 B2* | 4/2013 | Lupescu | ................ | F02M 26/35 |
| | | | | 60/299 |
| 8,448,422 B2* | 5/2013 | Uhrich | ................ | F02M 25/089 |
| | | | | 60/284 |
| 9,611,813 B2* | 4/2017 | Dudar | ................ | F02M 25/0818 |
| 9,970,393 B2* | 5/2018 | Dudar | ................. | F02M 25/089 |
| 10,138,827 B2 | 11/2018 | Dudar | | |
| 10,815,937 B2 | 10/2020 | Dudar | | |
| 10,934,908 B2* | 3/2021 | Wodausch | ............. | F02M 25/08 |
| 10,961,937 B2 | 3/2021 | Dudar | | |
| 11,261,770 B1* | 3/2022 | Delleree | ................ | F01N 3/2013 |
| 11,306,685 B1* | 4/2022 | Dudar | .................... | F02M 25/08 |
| 11,480,137 B1* | 10/2022 | Dudar | ................ | F02M 25/0809 |
| 11,708,780 B1 | 7/2023 | Dudar | | |
| 2006/0081224 A1* | 4/2006 | Spink | ................ | G05D 16/0663 |
| | | | | 123/519 |
| 2007/0239330 A1* | 10/2007 | Baumann | ........... | F02M 25/0818 |
| | | | | 701/123 |
| 2009/0007890 A1* | 1/2009 | Devries | ................ | F02M 25/089 |
| | | | | 123/520 |
| 2011/0079201 A1* | 4/2011 | Peters | ................ | F02M 25/0818 |
| | | | | 123/520 |
| 2013/0081600 A1* | 4/2013 | Fukui | ..................... | F01N 3/101 |
| | | | | 123/520 |
| 2014/0318506 A1* | 10/2014 | Yang | ................ | F02M 25/0809 |
| | | | | 903/902 |
| 2015/0354510 A1* | 12/2015 | Dudar | ................ | F02M 25/0818 |
| | | | | 73/40.7 |
| 2016/0082832 A1* | 3/2016 | Dudar | .................. | B60K 15/077 |
| | | | | 206/459.1 |
| 2016/0348614 A1* | 12/2016 | Dudar | ..................... | B60T 13/46 |
| 2017/0002761 A1* | 1/2017 | Dudar | .................... | F02D 41/22 |
| 2017/0198662 A1* | 7/2017 | Dudar | ................ | F02M 25/0818 |
| 2017/0198671 A1* | 7/2017 | Dudar | .................. | F02M 35/104 |
| 2017/0204796 A1* | 7/2017 | Dudar | ................ | F02M 25/089 |
| 2018/0291833 A1* | 10/2018 | Sukegawa | ............... | F02D 41/34 |
| 2019/0024553 A1* | 1/2019 | Sakurai | ............... | E02F 9/00 |
| 2019/0211769 A1* | 7/2019 | Dudar | ..................... | B60K 6/24 |
| 2019/0249581 A1* | 8/2019 | Wodausch | .............. | F01N 9/002 |
| 2019/0285017 A1* | 9/2019 | Dudar | ..................... | F02D 41/064 |
| 2019/0293031 A1* | 9/2019 | Dudar | .................. | F01N 3/2006 |
| 2019/0383240 A1* | 12/2019 | Ishikawa | ............ | F02M 25/0809 |
| 2020/0355135 A1* | 11/2020 | Yoshioka | ................ | F01N 3/035 |
| 2020/0386193 A1* | 12/2020 | Dudar | ..................... | F02B 37/18 |
| 2021/0402872 A1* | 12/2021 | Rignäs | ................. | H01M 10/663 |
| 2022/0222986 A1* | 7/2022 | Dudar | ................. | G01C 21/3461 |
| 2022/0298946 A1* | 9/2022 | Dudar | ................. | F02D 41/064 |
| 2024/0200518 A1* | 6/2024 | Baur | ..................... | F02M 26/35 |

* cited by examiner

SYSTEMS AND METHODS FOR A FUEL REFILL PRESSURE RELIEF VALVE

FIELD

The present description relates generally to methods and systems for diagnostics of a fuel refill pressure relief valve (FRPRV) of an evaporative emissions control (EVAP) system.

BACKGROUND/SUMMARY

A hybrid vehicle may include a fuel tank that is configured to store fuel vapors during diurnal heating and cooling so that diurnal fuel vapors may not have to be stored in a carbon filled fuel vapor storage canister. However, storing fuel vapor in the fuel tank instead of in a carbon filled canister may cause pressure in the fuel tank to rise when fuel is heated and decline when fuel is cooled. One way to prevent fuel vapor from escaping via a fuel inlet port when the fuel inlet port is opened prior to refueling may be to open a valve and allow fuel vapor to exit the fuel tank or air to enter the fuel tank so that pressure inside of the fuel tank is substantially atmospheric pressure when the fuel inlet port is opened. Directly venting fuel vapors to atmosphere may not be desirable, since hydrocarbons may be regulated emissions. Further, it may take a large volume carbon filled fuel vapor storage canister to capture all of the hydrocarbons that may exit the fuel tank during fuel refilling. Therefore, it may be desirable to process the fuel vapors so that they are not admitted to atmosphere. One way to process fuel vapors may be to release the fuel vapors from the fuel tank to a catalyst in an engine's exhaust system so that the catalyst may process the fuel vapors. Nevertheless, routing fuel vapors to a catalyst for processing may add a valve and vapor lines to a vehicle's evaporative emissions system. Regulating entities may specify that the valve and its associated vapor lines are to be evaluated on an on-going basis to permit operation of the vehicle.

In one example, components of an emissions system may be diagnosed via a method for an engine, comprising: activating a pump and commanding a fuel refill pressure relief valve open in response to a request to diagnose the fuel refill pressure relief valve, the fuel refill pressure relief valve located along a first passage between an engine exhaust system and a fuel tank.

By activating a pump and commanding the fuel refill pressure relief valve open, it may be possible to provide the technical result of determining whether or not the fuel refill pressure relief valve may be operating as may be desired. In particular, flow through an exhaust system and into an evaporative emissions system may be indicative of a properly opening fuel refill pressure relief valve. Similarly, cessation of flow from an exhaust system to an evaporative emissions system may be indicative of a properly closing fuel refill pressure relief valve.

The present approach provides several advantages. First, the approach allows for diagnosing operation of a fuel refill pressure relief valve so as to meet promulgated vehicle emissions regulations. Additionally, the approach may provide for particularly identifying operation of one or more emissions devices. Further, the approach may be performed without additional hardware, thereby controlling the financial cost of the approach.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
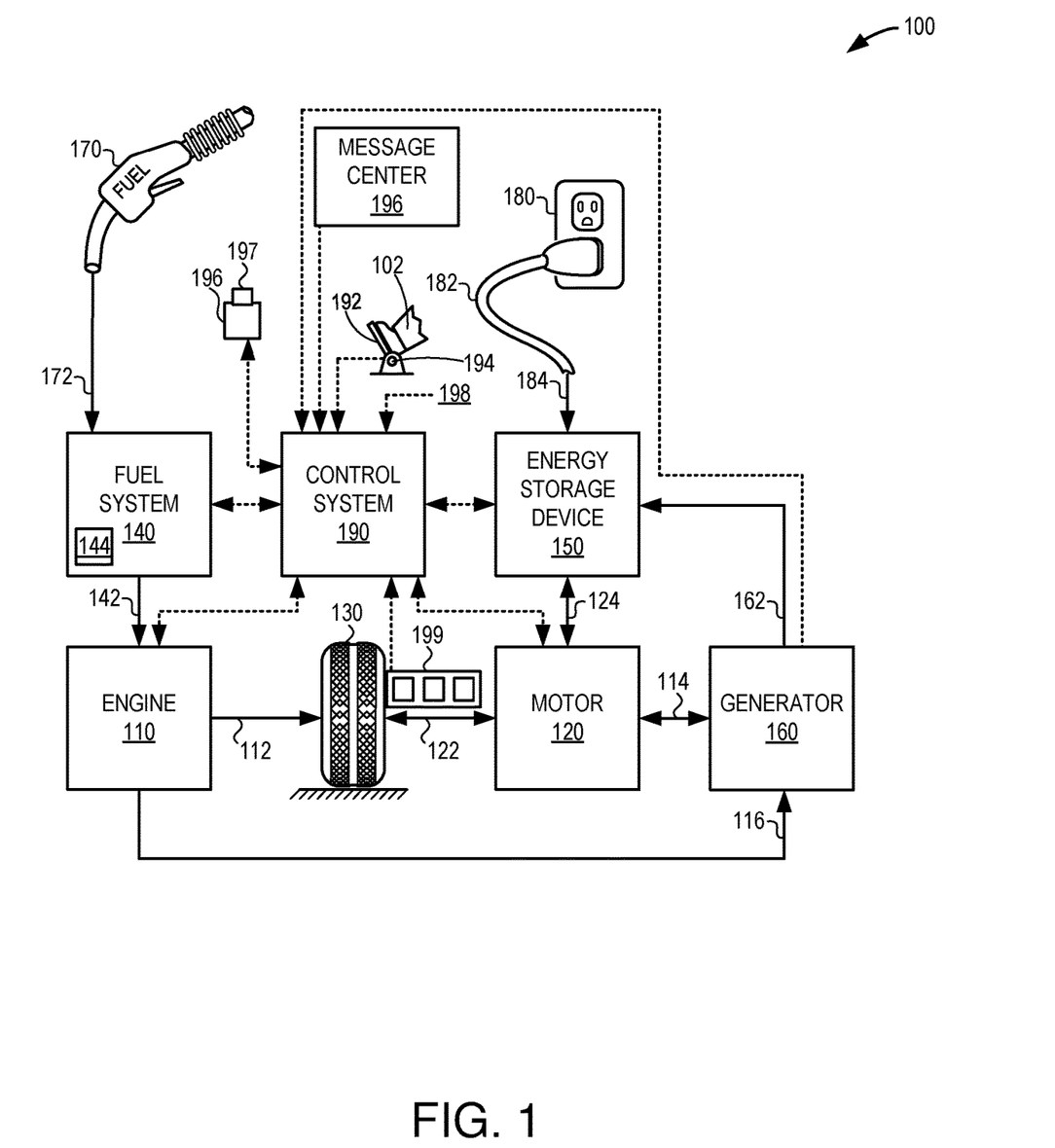
FIG. 1 shows a high-level block diagram illustrating an example vehicle system.
Figure 2:
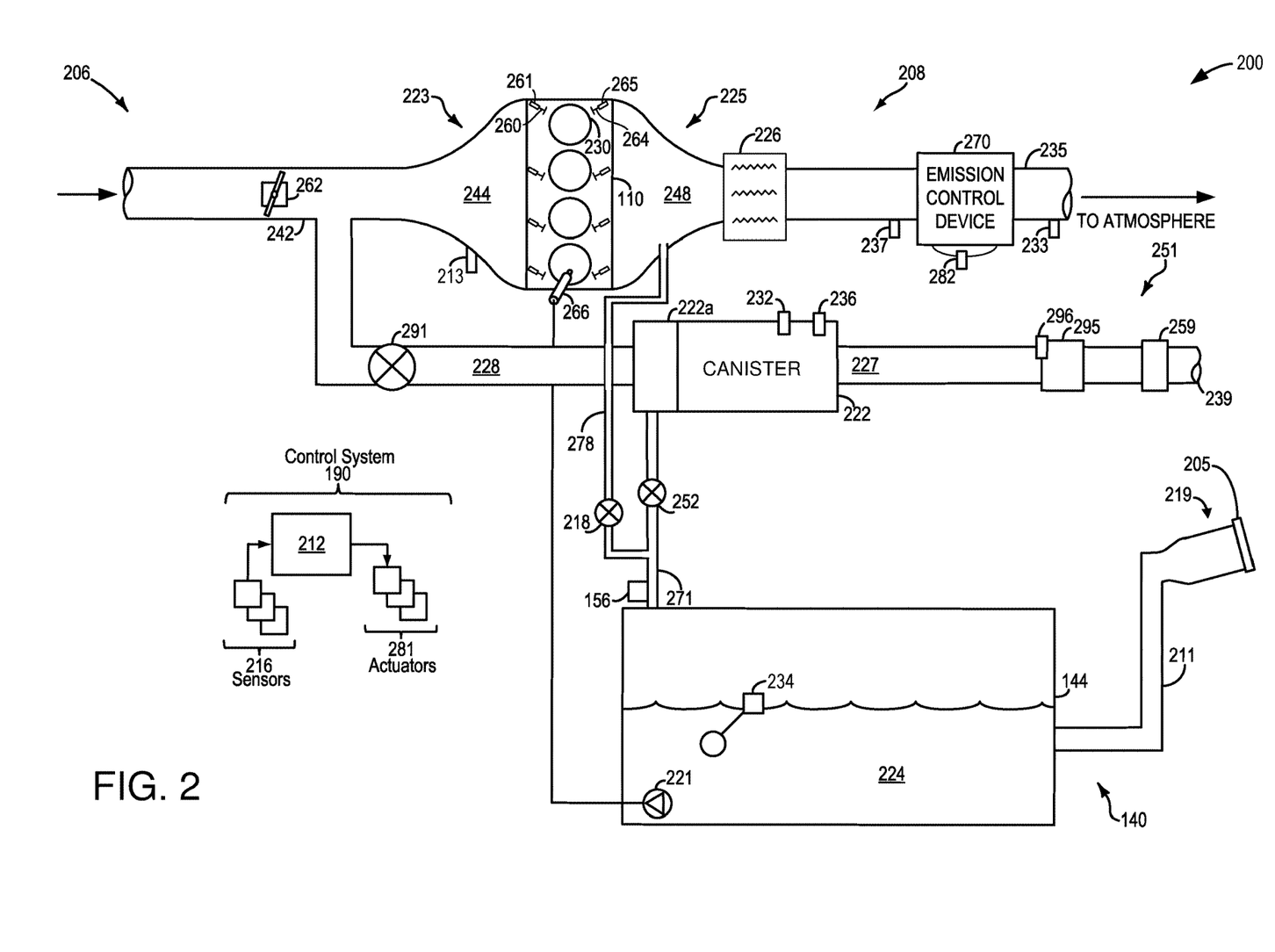
FIG. 2 shows a schematic diagram of a fuel system and an evaporative emissions control (EVAP) system including in the example vehicle system of FIG. 1.

The following description relates to systems and methods for diagnosing the integrity of a fuel refill pressure relief valve (FRPRV) of an evaporative emission control (EVAP) system of an engine. The engine may be included as part of a vehicle system, as illustrated in FIG. 1. The engine may be coupled to an EVAP system and a fuel system as shown in FIG. 2. The system of FIGS. 1 and 2 may be operated according to the method of FIGS. 3 and 4. The system of FIGS. 1 and 2 and the method of FIGS. 3 and 4 may operate as shown in the operating sequence of FIG. 5.

FIG. 1 illustrates an example vehicle propulsion system 100. Vehicle propulsion system 100 includes an internal combustion engine 110 and a motor 120 (e.g., an electric machine). Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state, in other words set to a deactivated state, where combustion of fuel via the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122, where the motor may convert the kinetic energy of the vehicle to electrical energy for storage at energy storage device 150 as indicated by arrow 124. This operation may be referred to as regenerative braking of the vehicle. Thus, motor 120 may provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle, such as sealed pressure-less non-integrated refueling canister-only systems (NIRCOS) fuel tanks. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of the engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal, or alternatively, a driver demand pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it may be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 (e.g., human/machine interface) may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank 144 in the vehicle may be depressurized so that refueling may be performed.

Referring now to FIG. 2, a schematic diagram 200 depicting a vehicle system 206 is shown. In some examples, vehicle system 206 may be an HEV system, such as a PHEV system. For example, vehicle system 206 may be the same as vehicle propulsion system 100 of FIG. 1. However, in other examples, vehicle system 206 may be implemented in a non-hybrid vehicle (e.g., a vehicle equipped with an engine and without a motor operable to at least partially propel the vehicle).

Vehicle system 206 may include an engine system 208 coupled to each of an evaporative emissions control (EVAP) system 251 and fuel system 140. Engine system 208 may include engine 110 having a plurality of cylinders 230. Engine 110 may include an engine air intake system 223 and an engine exhaust system 225. Each cylinder may include an intake poppet valve 260 and an intake poppet valve actuator 261. Intake poppet valve actuator 261 may be electrically, mechanically, or hydraulically operated and it may hold an intake valve in an open or closed position for an entire cycle of the engine, if desired. Likewise, each cylinder may include an exhaust poppet valve 264 and an exhaust poppet valve actuator 265. Exhaust poppet valve actuator 265 may be electrically, mechanically, or hydraulically operated and it may hold an exhaust valve in an open or closed position for an entire cycle of the engine, if desired. Engine air intake system 223 may include a throttle 262 in fluidic communication with an engine intake manifold 244 via an intake passage 242. Further, engine air intake system 223 may include an air box and filter (not shown) positioned upstream of throttle 262. Engine exhaust system 225 may include an exhaust manifold 248 leading to an exhaust passage 235 that routes exhaust gas to the atmosphere. Engine exhaust system 225 may include an electrically heated catalyst 226 and an emission control device 270, which may include one or more exhaust catalysts. For instance, emission control device 270 may include one or more of a three-way catalyst, a lean nitrogen oxide (NOx) trap, a particulate filter, an oxidation catalyst, etc. In some examples, flow through the emissions control device 270 may be sensed via a differential pressure sensor 282.

It will be appreciated that other components may be included in engine system 208 such as a variety of valves and sensors. For example, a barometric pressure sensor 213 may be included in engine air intake system 223. In one example, barometric pressure sensor 213 may be a manifold air pressure (MAP) sensor and may be coupled to engine intake manifold 244 downstream of throttle 262. Barometric pressure sensor 213 may rely on part throttle or full or wide open throttle conditions, e.g., when an opening amount of throttle 262 is greater than a threshold, in order to accurately determine a barometric pressure. Additionally, the engine system may further include an ambient temperature sensor (not shown).

Fuel system 140 may include fuel tank 144 coupled to a fuel pump system 221. Fuel pump system 221 may include one or more pumps for pressurizing fuel delivered to cylinders 230 via fuel injectors 266 during a single cycle of cylinders 230 (while only a single fuel injector 266 is shown at FIG. 2, additional fuel injectors may be provided for each cylinder 230). A distribution or relative amounts of fuel delivered, injection timing, etc. may vary with operating conditions such as engine load, engine knock, exhaust temperature, etc. responsive to different operating or degradation states of fuel system 140, engine 110, etc. A pressure in the fuel system may be estimated via a fuel tank pressure transducer (FTPT) 156. In one example, the FTPT 156 may be included within the fuel tank 144.

Fuel system 140 may be a return-less fuel system, a return fuel system, or any one of various other types of fuel system. Fuel tank 144 may hold a fuel 224 including a plurality of fuel blends, e.g., fuel with a range of alcohol concentrations, such as gasoline, various gasoline-ethanol blends (including E10, E85), etc. A fuel level sensor 234 disposed in fuel tank 144 may provide an indication of the fuel level ("Fuel Level Input") to a controller 212 included in control system 190. As depicted, fuel level sensor 234 may include a float coupled to a variable resistor. Alternatively, other types of fuel level sensors may be used.

Vapors generated in fuel system 140 may be routed to EVAP system 251 via a first conduit 271 that extends between fuel tank 144 and carbon filled fuel vapor storage canister 222. Fuel vapors stored in fuel tank 144 may be routed to electrically heated catalyst 226 via second conduit 278. Fuel vapors stored in carbon filled fuel vapor storage canister 222 may be routed to intake manifold 244 via third conduit 228 (e.g., a passage). Fourth conduit 227 (e.g., a passage) extends between carbon filled fuel vapor storage canister 222 and atmospheric port 239.

A fuel tank isolation valve (FTIV) 252 for isolating the fuel tank during certain conditions is shown positioned along first conduit 271. For example, during engine operation, FTIV 252 may be kept closed to reduce the amount of diurnal or "running loss" vapors directed to carbon filled fuel vapor storage canister 222 from fuel tank 144. During refueling operations and selected purging conditions, FTIV 252 may be temporarily opened, e.g., for a duration, to direct fuel vapors from the fuel tank 144 to carbon filled fuel vapor storage canister 222. Further, FTIV 252 may also be temporarily opened when the fuel tank pressure is higher than a threshold (e.g., above a mechanical pressure limit of the fuel tank), such that fuel vapors may be released into the carbon filled fuel vapor storage canister 222 and the fuel tank pressure is maintained below the threshold.

EVAP system 251 may further include a fuel refill pressure relief valve (FRPRV) 218 configured in parallel with the FTIV 252. The FRPRV 218 may be a normally closed valve, as part of the NIRCOS fuel system. The FRPRV 218 may be controlled by the controller using a pulse-width modulation cycle to control pressure while the fuel tank 144 is being refueled. Electrically heated catalyst 226 may be activated prior to opening of FRPRV so that fuel vapors may be processed via electrically heated catalyst 226.

As depicted in FIG. 2, the FRPRV 218 and the FTIV 252 are illustrated as being outside of the tank, though it may be appreciated that in other examples, the FRPRV 218 and FTIV 252, along with sections of first conduit 271 and second conduit 278 may be contained wholly within the fuel tank without departing from the scope of the present disclosure.

In some examples, refueling system 219 may include a fuel cap 205 for sealing off the refueling system from the atmosphere. Refueling system 219 may be coupled to fuel tank 144 via a fuel filler pipe 211. During refueling, fuel cap 205 may be manually opened or may be automatically opened responsive to a refueling request received at controller 212. A fuel dispensing device (e.g., shown in FIG. 1 as 170) may be received by, and thereafter fluidically coupled to, refueling system 219, whereby fuel may be supplied to fuel tank 144 via fuel filler pipe 211. Refueling may continue until the fuel dispensing device is manually shut off or until fuel tank 144 is filled to a threshold fuel level (e.g., until feedback from fuel level sensor 234 indicates the threshold fuel level has been reached), at which point a mechanical or otherwise automated stop of the fuel dispensing device may be triggered.

EVAP system 251 may include one or more emissions control devices, such as carbon filled fuel vapor storage canister 222 filled with an appropriate adsorbent, the carbon filled fuel vapor storage canister being configured to temporarily trap fuel vapors (including vaporized hydrocarbons) during refueling operations. In one example, the adsorbent used may be activated charcoal. EVAP system 251 may further include a canister ventilation path or via fourth conduit 227 which may route gases out of carbon filled fuel vapor storage canister 222 to the atmosphere when storing, or trapping, fuel vapors from fuel system 140.

Carbon filled fuel vapor storage canister 222 may include a buffer 222a (or buffer region), each of the carbon filled fuel vapor storage canister and the buffer including the adsorbent. As shown, a volume of buffer 222a may be smaller than (e.g., a fraction of) a volume of carbon filled fuel vapor storage canister 222. The adsorbent in buffer 222a may be the same as, or different from, the adsorbent in carbon filled fuel vapor storage canister 222 (e.g., both may include charcoal). Buffer 222a may be positioned within carbon filled fuel vapor storage canister 222 such that, during canister loading, fuel tank vapors may first be adsorbed within the buffer, and then when the buffer is saturated, further fuel tank vapors may be adsorbed in a remaining volume of the carbon filled fuel vapor storage canister. In comparison, during purging of carbon filled fuel vapor storage canister 222, fuel vapors may first be desorbed from the carbon filled fuel vapor storage canister (e.g., to a threshold amount) before being desorbed from buffer 222a. In other words, loading and unloading of buffer 222a may not be linear with loading and unloading of carbon filled fuel vapor storage canister 222. As such, one effect of buffer 222a is to dampen any fuel vapor spikes flowing from fuel tank 144 to carbon filled fuel vapor storage canister 222, thereby reducing a possibility of any fuel vapor spikes going to engine 110.

In some examples, one or more temperature sensors 232 may be coupled to and/or within carbon filled fuel vapor storage canister 222. As fuel vapor is adsorbed by the adsorbent in carbon filled fuel vapor storage canister 222, heat may be generated (heat of adsorption). Likewise, as fuel vapor is desorbed by the adsorbent in carbon filled fuel vapor storage canister 222, heat may be consumed. In this way, the adsorption and desorption of fuel vapor by carbon filled fuel vapor storage canister 222 may be monitored and estimated based on temperature changes within the carbon filled fuel vapor storage canister. Further, one or more canister heating elements 236 may be coupled to and/or within the carbon filled fuel vapor storage canister 222. Canister heating element 236 may be used to selectively heat the canister (and the adsorbent contained within) for example, to increase desorption of fuel vapors prior to performing a purge operation. Canister heating element 236 may comprise an electric heating element, such as a conductive metal, ceramic, or carbon element that may be heated electrically, such as a thermistor. In some embodiments, canister heating element 236 may comprise a source of microwave energy, or may comprise a canister jacket coupled to a source of hot air or hot water. Canister heating element 236 may be coupled to one or more heat exchangers that may facilitate the transfer of heat, (e.g., from hot exhaust) to the carbon filled fuel vapor storage canister 222. Canister heating element 236 may be configured to heat air within the carbon filled fuel vapor storage canister 222, and/or to directly heat the adsorbent located within carbon filled fuel vapor storage canister 222. In some embodiments, canister heating element 236 may be included in a heater compartment coupled to the interior or exterior of the carbon filled fuel vapor storage canister 222. In some embodiments, the carbon filled fuel vapor storage canister 222 may be coupled to one or more cooling circuits, and/or cooling fans.

In this way, the carbon filled fuel vapor storage canister 222 may be selectively cooled to increase adsorption of fuel vapors (e.g., prior to a refueling event). In some examples, canister heating element 236 may comprise one or more Peltier elements, which may be configured to selectively heat or cool the carbon filled fuel vapor storage canister 222.

Fourth conduit 227 may also allow fresh air to be drawn into carbon filled fuel vapor storage canister 222 when purging stored fuel vapors from fuel system 140 to engine air intake system 223 via third conduit 228 and canister purge valve (CPV) 291. For example, CPV 291 may be a normally closed valve, but may be opened during certain conditions so that vacuum from engine intake manifold 244 may be provided to carbon filled fuel vapor storage canister 222 for purging. In some examples, fourth conduit 227 may further include an air filter 259 disposed therein downstream of carbon filled fuel vapor storage canister 222.

In some examples, EVAP system 251 may further include an evaporative level check monitor (ELCM) 295. ELCM 295 may be disposed in fourth conduit 227, between carbon filled fuel vapor storage canister 222 and air filter 259, and may be configured to control venting and/or assist in detection of undesired evaporative emissions. As an example, ELCM 295 may include a vacuum pump 296 for applying negative pressure to the fuel system when administering a test for undesired evaporative emissions. In some embodiments, the vacuum pump may be configured to be reversible. In other words, the vacuum pump may be configured to apply either a negative pressure or a positive pressure on the EVAP system 251 and fuel system 140.

Routines for detecting undesired evaporative emission may be intermittently performed by controller 212 on fuel system 140 to confirm that the fuel system is not degraded. As such, undesired evaporative emission detection routines may be performed while the engine is off (engine-off degradation test) using engine-off natural vacuum (EONV) generated due to a change in temperature and pressure at the fuel tank following engine shutdown and/or with vacuum supplemented from a vacuum pump. Alternatively, undesired evaporative emission detection routines may be performed while the engine is running by operating a vacuum pump and/or using engine intake manifold vacuum. Undesired evaporative emission tests may be performed by the ELCM 295 communicatively coupled to controller 212.

Fuel system 140 may be a non-integrated refueling canister-only system (NIRCOS), in that fuel tank 144 may be substantially isolatable from carbon filled fuel vapor storage canister 222 such that fuel vapors in fuel tank 144 and carbon filled fuel vapor storage canister 222 may be independently controlled as desired (e.g., during refueling). During periods in which fuel tank 144 is fluidically decoupled from carbon filled fuel vapor storage canister 222, a fuel vapor pressure may develop within the fuel tank. Accordingly, venting and depressurization control routines are often implemented for NIRCOS fuel tanks, along with structural reinforcement thereof. For example, a given NIRCOS may include numerous valves and venting lines coupled to fuel tank(s) included therein to ensure that any excess fuel vapor pressure is properly evacuated or redistributed. Further, NIRCOS fuel tanks may be constructed of high tensile-strength material, such as heavy steel, and configured with a plurality of standoffs therein, the plurality of standoffs extending between opposing walls of a given NIRCOS fuel tank, such that greater fuel vapor pressures may be withstood without fuel tank degradation.

Fuel system 140 may be operated by controller 212 in a plurality of modes by selective adjustment of the various valves (e.g., responsive to the various sensors). For example, fuel system 140 may be operated in a refueling mode (e.g., when refueling is requested by a vehicle operator), wherein controller 212 may close FTIV 252. Additionally, fuel system 140 may be operated in a venting mode. In the venting mode, controller 212 may open FTIV 252 and canister vent valve 229, while maintaining CPV 291 closed, to direct refueling vapors into carbon filled fuel vapor storage canister 222 while preventing fuel vapors from being directed into engine intake manifold 244 (and thus provide a venting path for fuel vapors). As such, opening FTIV 252 may allow refueling vapors to be stored in carbon filled fuel vapor storage canister 222. After refueling is completed, at least FTIV 252 may be closed once again.

As another example, the fuel system may be operated in a canister purging mode (e.g., after a given emission control device light-off temperature has been attained and with engine 110 running), wherein controller 212 may open CPV 291 and canister vent valve 229 while closing FTIV 252. Herein, the vacuum generated by engine intake manifold 244 of (operating) engine 110 may be used to draw fresh air through fourth conduit 227 and through carbon filled fuel vapor storage canister 222 to purge stored fuel vapors into engine intake manifold 244. As such, in the canister purging mode, the purged fuel vapors from carbon filled fuel vapor storage canister 222 may be combusted in engine 110. The canister purging mode may be continued until an amount or level of stored fuel vapors in carbon filled fuel vapor storage canister 222 is below a threshold amount or level.

In still another example, the fuel system may be operated in a pressure relief mode during fuel refilling of fuel tank 144, whereby fuel vapors may be processed via electrically heated catalyst 226 when engine 110 is not combusting air and fuel. In particular, FTIV 252 may be closed and FRPRV 218 may be opened to allow fuel vapors in fuel tank 144 to be combusted within electrically heated catalyst 226 when refilling of fuel tank 144 is requested. Vacuum pump 296 may be activated to draw fuel vapors from fuel tank 144 through electrically heated catalyst during fuel tank refilling. This may allow fuel vapors to be processed (e.g., combusted) when carbon filled fuel vapor storage canister 222 is filled with fuel vapors, thereby reducing a possibility of hydrocarbons being released to atmosphere.

Control system 190, including controller 212, is shown receiving information from a plurality of sensors 216 (various examples of which are described herein) and sending control signals to a plurality of actuators 281 (various examples of which are described herein). Controller 212 may be configured as a powertrain control module (PCM). As one example, sensors 216 may include one or more of exhaust gas sensor 237 located upstream of emission control device 270 in exhaust passage 235, temperature sensor 233 located downstream of emission control device 270 in exhaust passage 235, fuel level sensor 234 located in fuel tank 144, temperature sensor 232 located in carbon filled fuel vapor storage canister 222, and FTPT 156. Other sensors such as pressure, temperature, air/fuel ratio, and composition sensors may be coupled to various locations in vehicle system 206. As an additional or alternative example, actuators 281 may include fuel injector 266, throttle 262, FTIV 252, CPV 291, and FRPRV 286. Controller 212 may receive input data from sensors 216, process the input data, and trigger actuators 281 in response to the processed input data based on instructions or code programmed in non-transitory memory therein, the instructions or code corresponding to one or more control routines.

Thus, the system of FIGS. 1 and 2 provides for a system for an vehicle, comprising: an internal combustion engine including an exhaust system; a fuel tank; an evaporative emissions system including a pump and a fuel refill pressure relief valve, the fuel refill pressure relief valve positioned along a first passage extending between the fuel tank and the exhaust system; and a controller including executable instructions stored in non-transitory memory that cause the controller to diagnose the fuel refill pressure relief valve via activating the pump. In a first example, the system further comprises additional executable instructions that cause the controller to monitor flow through the fuel refill pressure relief valve. In a second example that may include the first example, the system further comprises a differential pressure sensor. In a third example that may include one or both of the first and second examples, the system includes wherein flow is monitored through the fuel refill pressure relief valve via a differential pressure sensor. In a fourth example that may include one or more of the first through third examples, the system includes wherein the differential pressure sensor is configured to sense pressure across a particulate filter. In a fifth example that may include one or more of the first through fourth examples, the system further comprises additional executable instructions that cause the controller to command open the fuel refill pressure relief valve to diagnose the fuel refill pressure relief valve. In a sixth example that may include one or more of the first though fifth examples, the system further comprises a fuel tank isolation valve and additional executable instructions to command open the fuel tank isolation valve to diagnose the fuel refill pressure relief valve. In a seventh example that may include one or more of the first through sixth examples, the system includes where activating the pump causes gases to be drawn from the exhaust system to the pump.

Figure 3:
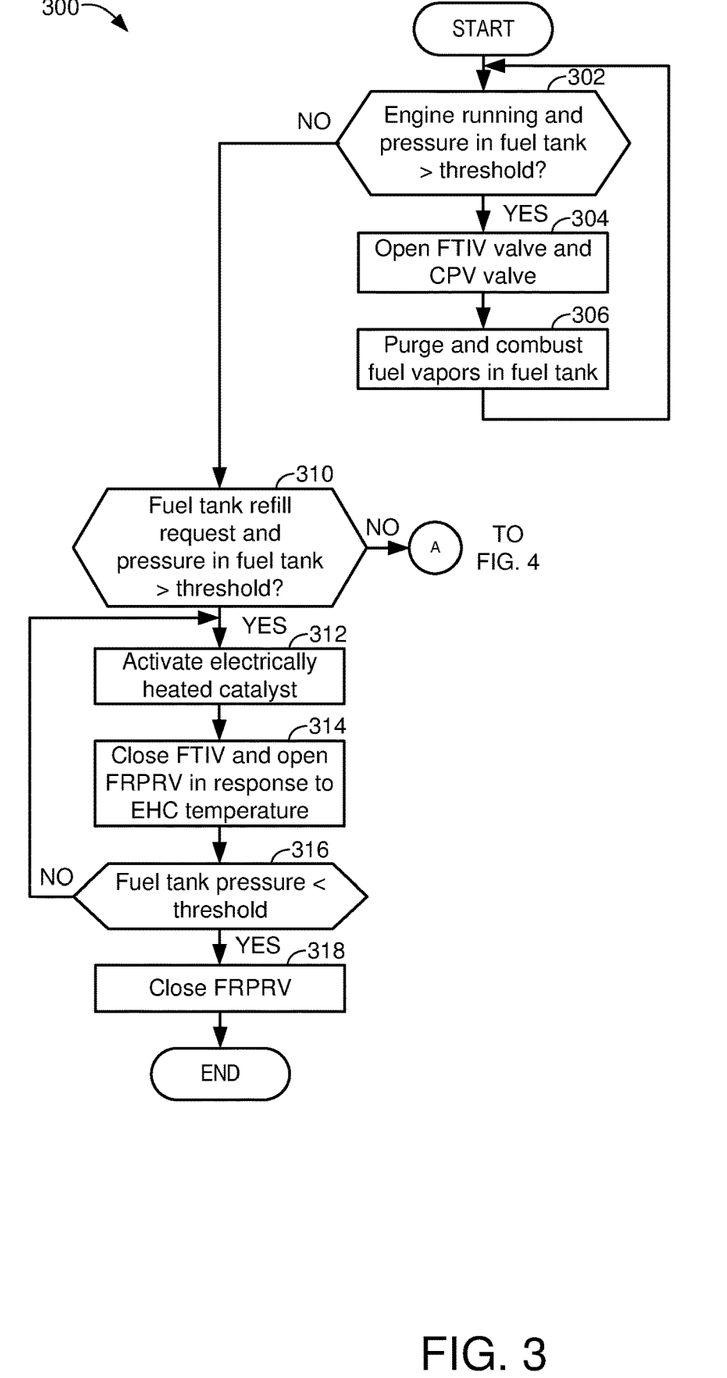
FIGS. 3 and 4 show a flow chart of an example method for operating a vehicle and its evaporative emissions system.
Figure 4:
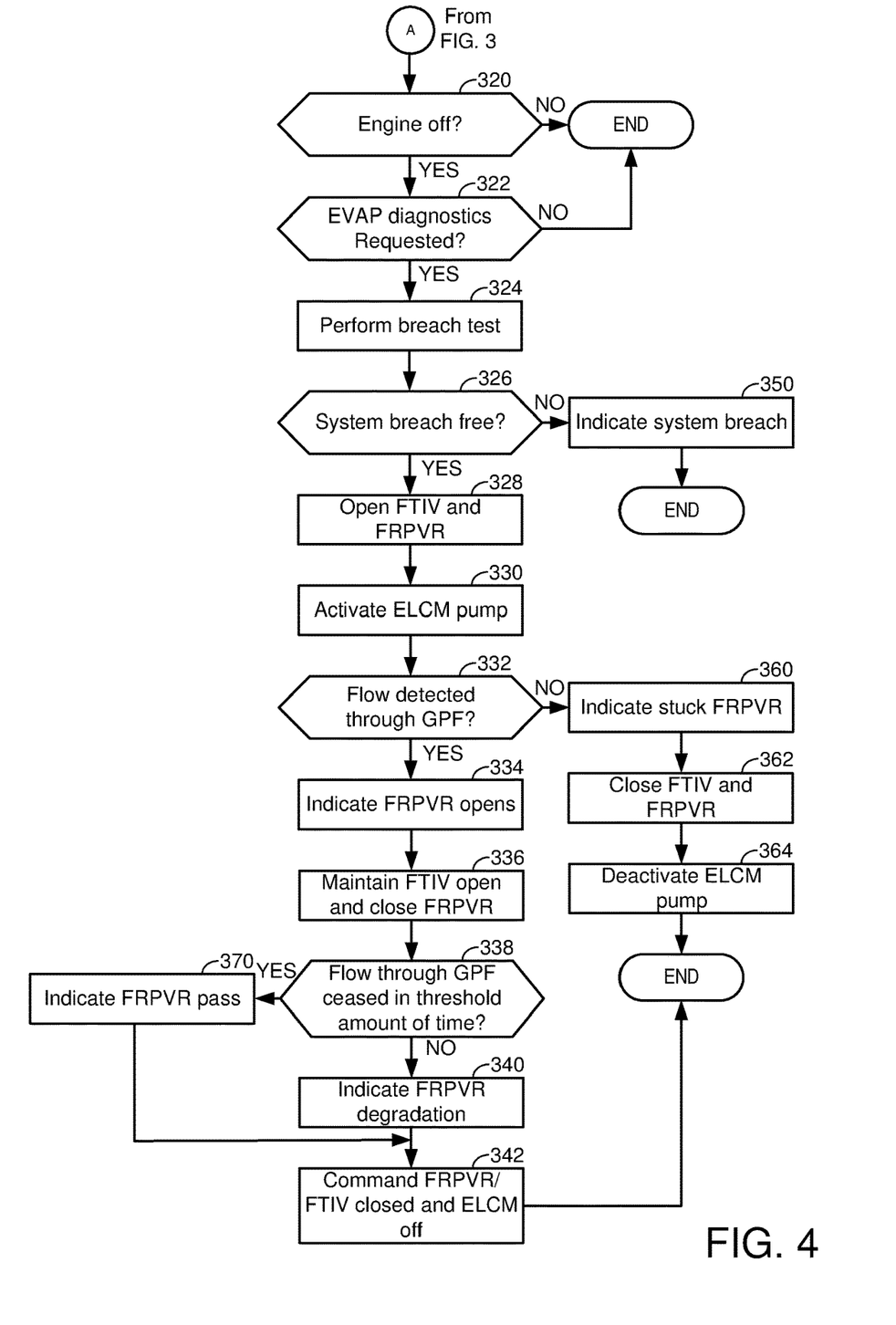

Turning now to FIGS. 3 and 4, a high-level flow chart for an example method 300 for operating an EVAP system is shown. The method 300 may be at least partially implemented as executable instructions stored in non-transitory memory of a controller in a system such as that shown in FIGS. 1 and 2. Further, the method of FIGS. 2 and 4 may include actions taken in the physical world to transform operating states of a system, such as the system of FIGS. 1 and 2. Further still, method 300 may be performed in cooperation with the system shown in FIGS. 1 and 2. The method of FIGS. 3 and 4 may also provide at least portions of the operating sequence shown in FIG. 5.

At 302, method 300 judges whether or not the engine is running (e.g., rotating and combusting fuel) and if pressure in the vehicle's fuel tank is greater than a threshold pressure. If so, the answer is yes and method 300 proceeds to 304. Otherwise, the answer is no and method 300 proceeds to 310.

At 304, method 300 opens the CPV and the FTIV. This allows fuel vapors to flow from the fuel tank to the engine. Method 300 proceeds to 306.

At 306, method 300 purges fuel vapors from the fuel tank and carbon filled fuel vapor storage canister to the engine where the fuel vapors are combusted. Method 300 returns to 302. At 310, method 300 judges whether or not there is a request to refill the fuel tank and if a pressure in the fuel tank is greater than a threshold pressure. If so, the answer is yes and method 300 proceeds to 312. Otherwise, the answer is no and method 300 proceeds to 320. In one example, a user may press a button to indicate that refueling is requested and to open a fuel access door and reduce pressure in a fuel tank. Pressure may build in the fuel tank due to diurnal heating of fuel.

At 312, method 300 activates an electrically heated catalyst and the electrically heated catalyst is brought up to operating temperature so that the electrically heated catalyst may combust hydrocarbons. Method 300 proceeds to 314.

At 314, method 300 closes the FTIV and opens the FRPRV in response to a temperature of the electrically heated catalyst exceeding a threshold temperature. Thus, method 300 may hold fuel vapors in the fuel tank until the electrically heated catalyst reaches operating temperature. Once the electrically heated catalyst reaches operating temperature, the fuel vapors are released to the electrically heated catalyst where they may be combusted. Method 300 proceeds to 316.

At 316, method 300 judges whether or not a pressure in the fuel tank is less than a threshold pressure. If method 300 judges that the pressure in the fuel tank is less than a threshold pressure, the answer is yes and method 300 proceeds to 316. Otherwise, the answer is no and method 300 returns to 312.

At 318, method 300 closes the FRPRV. Method 300 proceeds to exit.

Moving on to FIG. 4, at 320, method 300 judges whether or not the engine is off (e.g., not rotating and not combusting fuel). If method 300 judges that the engine is off, the answer is yes and method 300 proceeds to 320. Otherwise, the answer is no and method 300 proceeds to exit. At 322, method 300 judges whether evaporative emissions system diagnostics are requested. In one example, evaporative emission diagnostics may be performed at predetermined operating times or after the vehicle has travelled a predetermined distance. If method 300 judges that evaporative emissions diagnostics are requested, the answer is yes and method 300 proceeds to 324. Otherwise, the answer is no and method 300 proceeds to 324.

At 324, method 300 performs a breach test to determine whether or not air may flow into or out of the evaporative emissions system at higher than a predetermined rate when the evaporative emissions system's valves are positioned to reduce air flow into and out of the evaporative emissions system. In one example, method 300 may close the CPV, close the FRPRV, open the FTIV, close a canister vent valve (not shown), and activate the vacuum pump to reduce pressure within the evaporative emissions system. Once the vacuum in the evaporative emissions system is greater than a threshold amount, the vacuum pump is deactivated. If the vacuum in the evaporative emission system is greater than a threshold amount after the vacuum pump is deactivated for a predetermined amount of time, method 300 may judge that there is no breach. Otherwise, method 300 may judge that there is a breach. If method 300 judges that the evaporative emissions system is not free of a breach, the answer is no and method 300 proceeds to 350. If method 300 judges that the evaporative emissions system is not breached, the answer is yes and method 300 proceeds to 328. The breach test is performed when the engine is off.

At 350, method 300 indicates a breach of the evaporative emissions system via displaying a message on a human/machine interface. Method 300 may also indicate the breach to a cloud server or other external device. Method 300 proceeds to exit.

At 328, method 300 opens the FTIV and opens the FRPVR. Additionally, the engine may be rotated via an electric machine and the engine's exhaust and/or intake poppet valves are closed and held closed so as to seal the engine's cylinders closed. The FTIV is opened and the FRPVR is opened to permit flow from the engine's exhaust system through the evaporative emissions system and out to atmosphere. The carbon filled fuel vapor storage canister may trap fuel vapors that flow through the evaporative emissions system. Method 300 proceeds to 330.

At 330, method 300 activates the vacuum pump 296 in the ELCM and pulls gases from the engine's exhaust system through the evaporative emissions system if the FRPVR is open as commanded. Method 300 proceeds to 332.

At 332, method 300 judges whether or not gas flow through the gasoline particulate filter (GPF) is greater than a predetermined amount of flow and pressure in the fuel tank has dropped to less than a threshold amount of pressure. Flow through the GPF may be indicated by a differential pressure sensor. If method 300 judges that flow through the GPF is greater than a first threshold amount and a pressure in the fuel tank has been reduced by more than a second threshold amount after the vacuum pump 296 was activated, the answer is yes and method 300 proceeds to 334. If method 300 judges that flow through the GPF is less than the first threshold amount and a pressure in the fuel tank has not been reduced by the second threshold amount after the vacuum pump 296 was activated, the answer is no and method 300 proceeds to 360.

At 360, method 300 indicates that the FRPVR is stuck in a closed position. Method 300 may post a message regarding FRPVR degradation to a human/machine interface or external device (e.g., a cloud server). Method 300 proceeds to 362.

At 362, method 300 commands the FTIV closed and the FRPVR closed. The valves may be closed to prevent unintended opening of the FRPVR. Method 300 proceeds to 364. At 364, method 300 deactivates the vacuum pump of the ELCM. Method 300 proceeds to exit.

At 334, method 300 indicates that the FRPVR is operating as expected. The indication may be provided to a human/machine interface and/or a cloud server. Method 300 proceeds to 336.

At 336, method 300 maintains the FTIV in an open position and closes the FRPVR. The FTIV is commanded to remain open so that the vacuum pump may draw gases from upstream of the FTIV. Method 300 proceeds to 338.

At 338, method 300 judges whether or not flow of gases through the GPF has ceased to less than a threshold amount of flow in less than a predetermined amount of time. If so, the answer is yes and method 300 proceeds to 370. Otherwise, the answer is no and method 300 proceeds to 340.

At 370, method 300 indicates that the FRPVR is operating as may be expected. Method 300 proceeds to 342. The indication may be made via a human/machine interface or a remote cloud server.

At 340, method 300 indicates that the FRPVR is not operating as may be expected. Method 300 proceeds to 342. The indication may be made via a human/machine interface or a remote cloud server.

At 342, method 300 commands the FTIV closed and the FRPVR closed. Method 300 also commands the ELCM vacuum pump off. Method 300 proceeds to exit.

In this way, the method of FIGS. 3 and 4 may provide for a method for an engine, comprising: activating a pump and commanding a fuel refill pressure relief valve open in response to a request to diagnose the fuel refill pressure relief valve, the fuel refill pressure relief valve located along a first passage between an engine exhaust system and a fuel tank. In a first example, the method further comprises opening a fuel tank isolation valve in response to the request to diagnose the fuel refill pressure relief valve. In a second example that may include the first example, the method further comprises monitoring a flow through an emissions device. In a third example that may include one or both of the first and second examples, the method includes wherein the pump is positioned along a second passage between a carbon filled canister and an atmospheric opening. In a fourth example that may include one or more of the first through third examples, the method further comprises indicating degradation of the fuel refill pressure relief valve in response the flow being less than a threshold flow. In a fifth example that may include one or more of the first through four examples, the method further comprises indicating an absence of degradation in response to the flow being greater than the threshold flow. In a sixth example that may include one or more of the first though fifth examples, the method further comprises closing or holding closed all exhaust valves of the engine in response to the request to diagnose the fuel refill pressure relief valve.

The method of FIGS. 3 and 4 also provides for a method for an engine, comprising: closing exhaust valves of the engine and activating a pump in response to a request to diagnose a fuel refill pressure relief valve, the fuel refill pressure relief valve located along a first passage between an engine exhaust system and a fuel tank. In a first example, the method further comprises monitoring flow through an emissions device in response to the request to diagnose the fuel refill pressure relief valve. In a second example that may include the first example, the method includes wherein the engine is not combusting fuel and air. In a third example that may include one or both of the first and second examples, the method further comprises commanding open a fuel tank isolation valve. In a fourth example that may include one or more of the first through third examples, the method includes wherein the fuel tank isolation valve is located along a second passage, the second passage extending between a carbon filled canister and the fuel tank.

Figure 5:
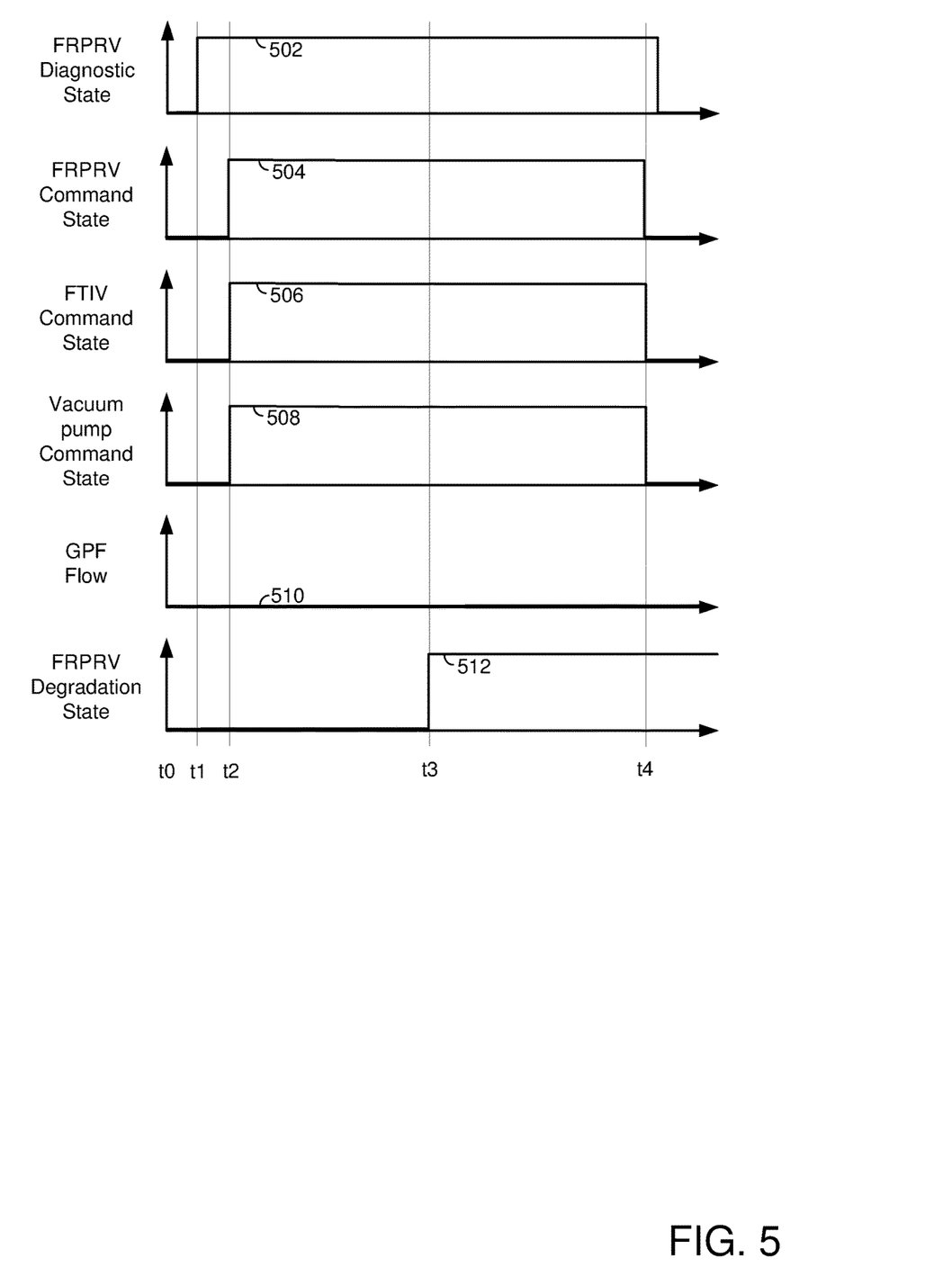
FIG. 5 shows an example operating sequence of the system of FIGS. 1 and 2 in cooperation with the method of FIGS. 3 and 4.

Turning now to FIG. 5, example operating sequence according to the system of FIGS. 1 and 2 and the method of FIGS. 3 and 4 is shown. The operating sequence of FIG. 5 may be provided via the system of FIGS. 1 and 2 in cooperation with the method of FIGS. 3 and 4. The vertical lines at times t0-t4 represent times of interest during the operating sequence. The plots are time aligned.

The first plot from the top of FIG. 5 is a plot of FRPRV diagnostic state versus time. The vertical axis represents FRPRV diagnostic state and the FRPRV diagnostic state indicates no diagnostic is being performed when trace 502 is near the horizontal axis. A diagnostic is requested when trace 502 is near the vertical axis arrow. The horizontal axis represents time and time increases from the left side of the plot to the right side of the plot. Trace 502 represents the FRPRV diagnostic state.

The second plot from the top of FIG. 5 is a plot of FRPRV command state versus time. The vertical axis represents FRPRV command state and the FRPRV command state indicates no command is being issued to open the FRPRV when trace 504 is near the horizontal axis. A command to open the FRPRV is issued when trace 504 is near the vertical axis arrow. The horizontal axis represents time and time increases from the left side of the plot to the right side of the plot. Trace 504 represents the FRPRV command state.

The third plot from the top of FIG. 5 is a plot of FTIV command state versus time. The vertical axis represents FTIV command state and the FTIV command state indicates no command is being issued to open the FTIV when trace 506 is near the horizontal axis. A command to open the FTIV is issued when trace 506 is near the vertical axis arrow. The horizontal axis represents time and time increases from the left side of the plot to the right side of the plot. Trace 506 represents the FTIV command state.

The fourth plot from the top of FIG. 5 is a plot of vacuum pump command state versus time. The vertical axis represents vacuum pump command state and the vacuum pump command state indicates that the vacuum pump is not commanded activated when trace 508 is near the horizontal axis. The vacuum pump is commanded on when trace 508 is near the vertical axis arrow. The horizontal axis represents time and time increases from the left side of the plot to the right side of the plot. Trace 508 represents the vacuum pump command state.

The fifth plot from the top of FIG. 5 is a plot of flow through the GPF versus time. The vertical axis represents GPF flow and GPF flow increases in the direction of the vertical axis arrow. The horizontal axis represents time and time increases from the left side of the plot to the right side of the plot. Trace 510 represents flow through the GPF.

The sixth plot from the top of FIG. 5 is a plot of FRPRV degradation state versus time. The vertical axis represents FRPRV degradation state and the FRPRV degradation state indicates no degradation is present when trace 512 is near the horizontal axis. Degradation is indicated when trace 512 is near the vertical axis arrow. The horizontal axis represents time and time increases from the left side of the plot to the right side of the plot. Trace 512 represents the FRPRV degradation state.

At time t0, the FRPRV diagnostic is not activated and the FRPRV is not commanded open. Further, the FTIV is not commanded open and the vacuum pump is not activated. The flow through the GPF is zero and FRPRV degradation is not indicated.

At time t2, the FRPRV diagnostic is activated and the FRPRV is commanded open. Further, the FTIV is commanded open and the vacuum pump is activated. The flow through the GPF remains zero and FRPRV degradation is not indicated.

At time t3, the FRPRV diagnostic remains activated and the FRPRV is commanded open. Further, the FTIV remains commanded open and the vacuum pump remains activated. However, the flow through the GPF remains zero so FRPRV degradation now indicated because a threshold amount of time has passed since the valves were opened and the vacuum pump was activated.

At time t4, the FRPRV diagnostic is deactivated and FRPRV degradation is indicated. The FRPRV is commanded closed and the FTIV is commanded closed. Additionally, the vacuum pump is commanded to be deactivated. The flow through the GPF remains near zero.

In this way, a FRPRV that may be selectively opened to release fuel vapors from a fuel tank and/or a carbon filled fuel vapor storage canister to an electrically heated catalyst for combusting the fuel vapors in a vehicle that may not have an internal engine that is started frequently. The FRPRV may be evaluated for opening and closing as commanded.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
 activating a pump and commanding a fuel refill pressure relief valve open in response to a request to diagnose the fuel refill pressure relief valve, the fuel refill pressure relief valve located along a first passage between an engine exhaust system and a fuel tank;
 opening a fuel tank isolation valve in response to the request to diagnose the fuel refill pressure relief valve;
 monitoring a flow through an emissions device, wherein the pump is positioned along a second passage between a carbon filled canister and an atmospheric opening;
 indicating degradation of the fuel refill pressure relief valve in response the flow being less than a threshold flow and indicating an absence of degradation in response to the flow being greater than the threshold flow; and
 closing or holding closed all exhaust valves of the engine in response to the request to diagnose the fuel refill pressure relief valve.

2. The method of claim 1, wherein the engine is coupled in a hybrid vehicle.

3. The method of claim 1, wherein the engine is coupled in a plug-in hybrid vehicle.

4. The method of claim 1, further comprising judging whether or not there is a request to refill the fuel tank, wherein a user may press a button to indicate that refueling is requested.

5. A system for a vehicle, comprising:
 an internal combustion engine including an exhaust system;
 a fuel tank;
 a differential pressure sensor configured to sense pressure across a particulate filter;
 an evaporative emissions system including a pump and a fuel refill pressure relief valve, the fuel refill pressure relief valve positioned along a first passage extending between the fuel tank and the exhaust system; and
 a controller including executable instructions stored in non-transitory memory that cause the controller to diagnose the fuel refill pressure relief valve via activating the pump, and to monitor flow through the fuel refill pressure relief valve, wherein flow is monitored through the fuel refill pressure relief valve via the differential pressure sensor.

6. The system of claim 5 further comprising additional executable instructions that cause the controller to command open the fuel refill pressure relief valve to diagnose the fuel refill pressure relief valve.

7. The system of claim 6; further comprising a fuel tank isolation valve and additional executable instructions to command open the fuel tank isolation valve to diagnose the fuel refill pressure relief valve.

8. The system of claim 7, where activating the pump causes gases to be drawn from the exhaust system to the pump.

9. A method for an engine, comprising:
 closing exhaust valves of the engine and activating a pump in response to a request to diagnose a fuel refill pressure relief valve, the fuel refill pressure relief valve located along a first passage between an engine exhaust system and a fuel tank.

10. The method of claim 9, further comprising monitoring flow through an emissions device in response to the request to diagnose the fuel refill pressure relief valve.

11. The method of claim 10, wherein the engine is not combusting fuel and air.

12. The method of claim 11, further comprising commanding open a fuel tank isolation valve.

13. The method of claim 12, wherein the fuel tank isolation valve is located along a second passage, the second passage extending between a carbon filled canister and the fuel tank.

* * * * *